Jan. 11, 1966   G. J. LASHER ETAL   3,229,095
APPARATUS FOR OBTAINING THE DIFFERENCE OF
TWO INCIDENT OPTICAL RADIATIONS
Filed May 20, 1963                    2 Sheets-Sheet 1

INVENTORS
GORDON J. LASHER
ARTHUR H. NETHERCOT, JR.

BY
ATTORNEY

United States Patent Office 3,229,095
Patented Jan. 11, 1966

3,229,095
APPARATUS FOR OBTAINING THE DIFFERENCE OF TWO INCIDENT OPTICAL RADIATIONS
Gordon J. Lasher, Briarcliff Manor, and Arthur H. Nethercot, Jr., Hastings on Hudson, N.Y., assignors to International Business Machines Corporation, New York, N.Y., a corporation of New York
Filed May 20, 1963, Ser. No. 281,523
10 Claims. (Cl. 250—84)

This invention relates to sources of radiation and more particularly to radiation sources which are capable of producing far infra-red radiation.

In recent years, there has been much activity in the development of various sources of radiation having wavelengths which fall in or near the visible light spectrum. The members of an extremely interesting class of devices of this type are characterized as lasers. These devices are generally capable of emitting coherent light (single phase monochromatic light). There have also been many developments in radiation generators for radiation in the wavelengths which are characterized as micro-waves. However, radiation generators have not been generally available for the efficient production of radiation in the wavelength range between the so-called micro-wave range and the infra-red range. This previously unavailable wavelength range may be characterized as the far infra-red range.

Accordingly, it is an object of the present invention to provide a radiation generator which is capable of producing coherent radiation in the far infra-red range.

As used in this specification, the term "far infra-red radiation" refers generally to radiation having a wavelength which is shorter than that of micro-waves, starting at a wavelength of approximately 1000 microns, and extending to the wavelength of infra-red light, which is approximately 10 microns. Thus, the far infra-red radiation is generally defined as radiation within the wavelength range from 10 microns to 1000 microns. This corresponds to a frequency range from about $3(10^{11})$ to $3(10^{13})$ cycles per second.

It is another object of the present invention to provide far infra-red radiation generators which are specifically adapted to shape the output beam of radiation to provide a desired focussing or deflection characteristic.

Another object of the present invention is to provide apparatus employing a far infra-red radiation generator which is capable of providing very accurate high amplitude amplification of an angular movement which is useful for purposes such as instrumentation.

Another object of the present invention is to provide apparatus for demodulating information on a coherent light carrier beam and for obtaining a demodulation signal in the form of a far infra-red radiation signal.

Another object of the present invention is to provide an intermediate frequency mixing apparatus for receiving information bearing carriers in the form of coherent light beams, and for providing a modulated intermediate frequency output which is in the form of a far infra-red radiation.

It has previously been suggested by others that it is possible to mix optical signals in a semi-conductor photoresponsive crystal and to obtain a micro-wave beat frequency output in a cavity tuned to the micro-wave frequency. See "Optical Frequency Mixing in Bulk Semi-Conductors," by D. Dimenico and others, published in Applied Physics Letters, Volume 1, No. 4, December 1, 1962, page 77. However, prior to the present invention, it has not been appreciated that by mixing of two optical signals in a high mobility semi-conductor crystal, it is possible to obtain optical difference frequency output signals in the far infra-red region. Furthermore, the theoretical explanations accompanying the prior publication imply that the present invention is actually impossible.

In carrying out the objects of the invention in one embodiment thereof, there is provided a high mobility small bandgap semi-conductor crystal having a surface region of one conductivity type. Electrodes are connected across the crystal to define the surface region, and these electrodes are arranged for connection to a source of unidirectional bias voltage. Coherent optical radiation is directed to the surface region at two wavelengths, the difference in frequencies of the two wavelengths being equal to the frequency of the desired radiation output.

Further features, objects and advantages of the invention will be apparent from the following description and the accompanying drawings which are briefly described as follows.

Figure 3:
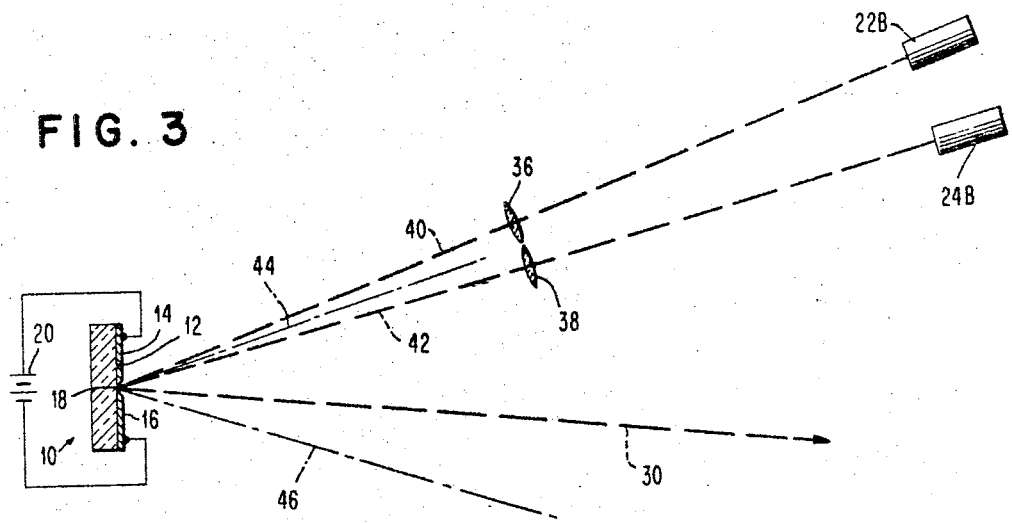
FIG. 3 is a schematic diagram of a further modified embodiment of the invention.
Figure 4:
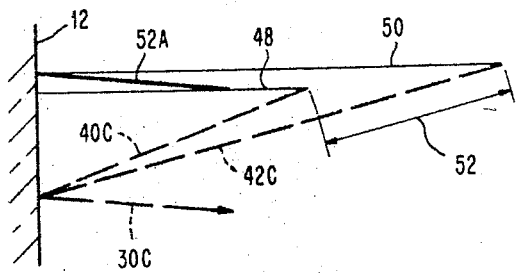
FIG. 4 is a vector diagram illustrating certain aspects of the operation of the embodiment of FIG. 3.
Figure 5:
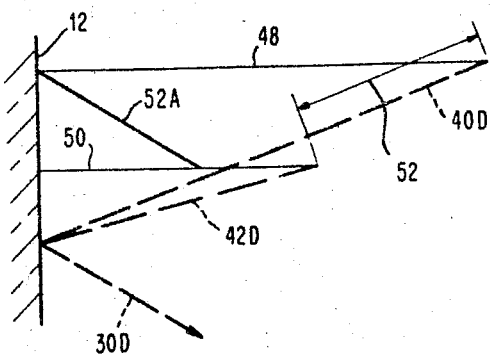

And FIG. 5 is a vector diagram similar to that of FIG. 4 and illustrating a different mode of operation of the embodiment of FIG. 3.

Figure 1:
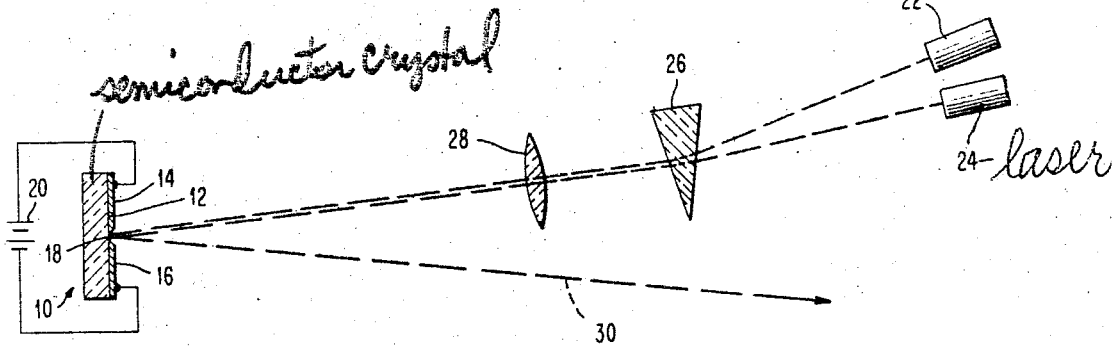
FIG. 1 is a schematic diagram of a preferred embodiment of the invention.

Referring in more detail to FIG. 1, there is shown a semi-conductor crystal 10 having a surface 12 upon which are affixed spaced electrodes 14 and 16. The electrodes 14 and 16 are closely spaced on the surface 12 to expose a very narrow surface region 18 of one conductivity type. Connected across the electrodes 14 and 16 there is a D.C. bias voltage as schematically illustrated by the battery 20. This bias voltage preferably produces an electric field of approximately 2000 volts per centimeter.

Coherent optical radiation at two different wavelengths is directed to the region 18 from lasers 22 and 24 by means of a prism 26 and a lens 28. As a result of this radiation, a difference frequency radiation is emitted from region 18 as indicated at 30. This difference signal frequency is quite strong and is the signal which is particularly desired and utilized in accordance with the present invention. The dispersive prism 26 receives the coherent light from each of the lasers 22 and 24 and bends the light in such a way that the light of both wavelengths approaches the crystal region 18 along the same path. The prism accomplishes this, in spite of the fact that the light from the two lasers approaches the prism at different angles, because the bending of the radiation in the prism is slightly different for the two laser outputs. This is due to the slight difference in wavelength between the two outputs. It will be understood, of course, that the spacing between the prism 26 and each of the lasers 22 and 24 may be substantially greater than the spacing shown in FIG. 1, so that the angle between the beams of light from the two lasers 22 and 24 will not be as great as it is shown to be in FIG. 1. It is apparent that the refraction apparatus including lens 28 and the prism 26 can be combined so that the combined optical result is achieved, if desired, with somewhat less loss through absorption in the solid optical material of which the lens and prism are composed.

To provide for optimum optical efficiency, the distance from the lens 28 to the crystal surface region 18 is equal to the focal length of the lens. Similarly, the distance from the lens 28 to either of the lasers 22 and 24, along the optical beam path is equal to the focal length of the lens. Furthermore, the focal length of the lens is chosen at such a dimension that the dispersion of a coherent light output beam from a single laser filament will be such as to illuminate an area of the lens 28 which is substantially equal to the active area of the crystal region 18. When these conditions exist, the radiation from any filament of the lasers 22 and 24 is directed in a substantially parallel beam from the lens 28 to the crystal region 18. Furthermore, the radiation from each filament will be substantially evenly spread over the crystal surface region 18.

Figure 2:
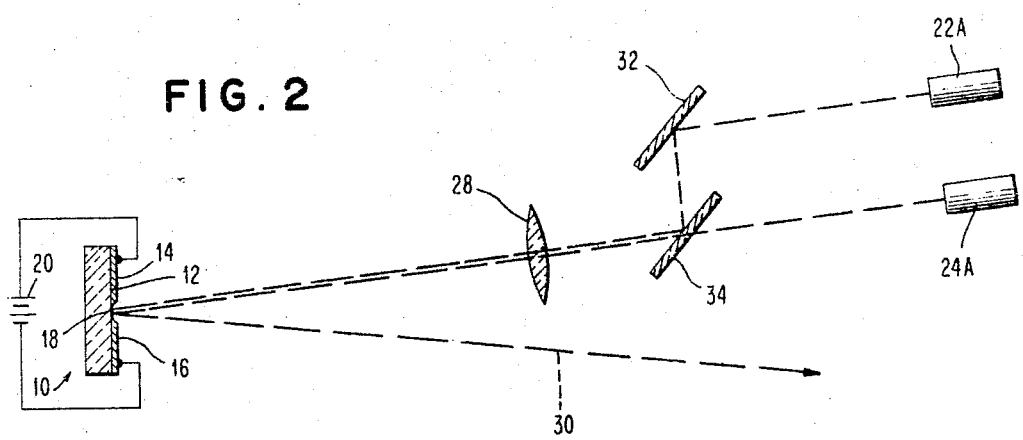
FIG. 2 is a schematic diagram of a modified embodiment of the invention.

The modified embodiment of FIG. 2 is substantially identical to that of FIG. 1, except that mirrors 32 and 34 are employed to get the two coherent radiation input beams to coincide rather than using the prism 26. This arrangement is preferable in some instances. The mirror 32 is a fully reflective mirror, and the mirror 34 is a half-reflect mirror. Since the half-reflect mirror 34 must provide for transmission of light and also for reflection of light, it cannot do either job with 100% efficiency, and accordingly, this arrangement results in at least a 50% loss in the input radiation to the crystal 10.

FIG. 3 is a further modified embodiment of the invention in which the input radiation beams from the lasers 22B and 24B respectively are applied to the region 18 in non-parallel directions. The radiation beam from laser 22B is directed through lens 36 as indicated at 40. The radiation beam from laser 24B is directed through lens 38 as indicated at 42. As in the earlier embodiment, an output radiation beam results as indicated at 30. The lenses 36 and 38 are substantially the same as lens 28 in FIG. 1. In the operation of the embodiments of FIGS. 1 and 2, where the two input radiation beams follow substantially coincident paths, the angle of the output radiation beam 30 is related in direction to the input radiation beams in very much the same way as a reflected beam of optical radiation would be. That is, the angle of the output beam with relation to a direction which is normal to the crystal surface is equal and opposite to the angle of the input radiation beams. However, when the two input beams are directed to the crystal surface at different angles, as indicated at 40 and 42 in FIG. 3, a different and more complicated relationship exists between the input beam angles and the angular direction of the output beam. In order to explain this relationship more effectively, a construction line 44 has been placed midway between the input beam lines 40 and 42. Another construction line 46 has also been added to the diagram of FIG. 3 at an angle equal and opposite to that of the construction line 44. If a truly simple and obvious relationship existed between the input angles of the beams 40 and 42, it might be anticipated that the output radiation beam 30 would follow the path indicated by construction line 46, since this would represent a mean angle of reflection. However, it is found that if the higher frequency of input radiation is from the laser 24B, which is closer to the direction normal to the surface 12, then the output radiation beam 30 is closer to the normal direction, as indicated in FIG. 3. If on the other hand, the higher radiation frequency is that which is derived from the outer laser 22B, then the output radiation beam 30 would appear at an angular direction which is below the construction line 46 and thus more distant from the normal direction. Thus, it might be said that the higher frequency of input radiation has a greater effect upon the direction of the output radiation than does the lower frequency of input radiation, for if the higher frequency input radiation is closer to the normal, then the output radiation will be closer to the normal, but if the higher frequency input radiation is more distant from the normal, then the output radiation will also be more distant from the normal. The actual direction of the output radiation 30 in the embodiment of FIG. 3 may be determined by a geometrical construction as shown in FIG. 4.

FIG. 4 is a geometrical construction which helps to demonstrate the operation of the embodiment of FIG. 3. The vector 40C is placed in a direction in relation to the surface 12 of the crystal 10 corresponding to the angular direction of the input radiation beam 40 of FIG. 3. This vector has a length which is proportional to the reciprocal of the wavelength of the input radiation beam 40. Similarly, the vector 42C has an angular direction with respect to the crystal surface 12 which corresponds to the angular direction of input radiation beam 42, and a length which is proportional to the reciprocal of the wavelength of that radiation. Projection lines 48 and 50 are placed between the outer ends of these vectors and the crystal surface 12, and perpendicular thereto. The difference in the lengths of the vectors 42C and 40C is then obtained, as indicated at 52, and this difference vector length is then laid out as indicated at 52A between the projection lines 48 and 50. This vector 52A indicates the resultant direction of the output radiation 30C and thus, vector 30C is derived by construction at the radiation reception point on the surface 12 and parallel to the construction vector 52A.

FIG. 5 illustrates a construction similar to that shown in FIG. 4, but for the opposite case where the higher frequency input radiation beam is more distant from the normal. Thus, in FIG. 5, the vector 40D represents a higher frequency input beam from the input source 22B of FIG. 3, and the vector 42D represents the lower frequency input radiation beam from source 24B. The method of performing the construction to obtain the vector 30D indicating the direction of the output radiation is identical to the method steps described above in connection with FIG. 4. However, in the case illustrated in FIG. 5, the output radiation direction is more distant from the normal. Because of this peculiar directional characteristic of the output radiation, it is quite apparent that with angular relationships between the input radiation beams and the crystal surface 12 which are similar to those shown in FIG. 5, amplification of a physical motion may be obtained. For instance, if the crystal 10 is rotated so that the angles of incidence of the input radiation beams are changed with relation to the surface 12, a marked change in the direction of output radiation, as indicated by vector 30D, will result. This change in output radiation may be used to indicate the direction and magnitude of the change in position of the crystal 10. Alternatively, the position of one of the input radiation sources, such as laser 22B may be changed so as to increase or decrease the angle between the input radiation beams 40 and 42. This again will cause a greater change in the direction of the output radiation 30D, which will serve as a measure of the physical movement.

From the above analysis of the operation of the apparatus of FIG. 3, which is made by reference to the vector diagram constructions of FIGS. 4 and 5, it is apparent that if different components of the two input beams 40 and 42 have different angular relationships, then there will be different components of the output radiation which will have respective directions determined by the angular relationships of the input radiation components. Thus, if input radiation optical systems are provided so that the input radiation beams approach the crystal surface along the same axis, and one of the beams has parallel components and the other of the beams has convergent components, then the output radiation will be made to converge. Similarly, it is apparent that divergent output radiation, or other optically modified output radiation may be obtained. This is quite interesting because the lens system causing the convergence or divergence or other modification of the output radiation is a part of the input radiation system, and the angles of output convergence, or divergence, etc., therefore do not have the usual relationship to the lens. This aspect of the invention is believed to be quite useful because the optical materials usually used for lenses are substantially opaque to the passage of at least certain parts of the far infrared radiation output spectrum available from the apparatus of the present invention. Thus, such lenses could not be used directly with such outputs.

The laser devices forming the sources of coherent radiation, such as 22 and 24 in FIG. 1, may be chosen from almost any of those currently available. However, they must provide the desired frequency difference in radiation output and preferably they should provide a high radiation intensity. Many such devices are described for instance in the January 1963 issue of the proceedings of the IEEE, Volume 51, No. 1, pages 1 to 294. Attention is particularly directed to the lead article entitled, "The Laser" by Yariv and Gordon beginning on page 4 of that publication. It is impractical to set forth all of the various possible laser combinations which can be effectively used with the present invention. However, several of those which are quite useful, for instance, are the combination of a ruby laser with another ruby laser, and the combination of a ruby laser and a helium-neon laser. Furthermore, it is known to be possible to obtain certain single lasers which are capable of emission of coherent radiation at two different frequencies. It will be understood that if such a single laser is employed in the present invention, the optical devices such as the prism 26 to obtain parallelism of the laser radiation are not necessary.

In certain instances, identical laser crystals may be employed, and the slight difference in frequency required for operation may be obtained by subjecting the two lasers to different operating temperatures. It is known that differences in temperature cause changes in the output radiation frequency of lasers. This raises the possibility of holding one of the lasers at a constant temperature, and of subjecting the other laser to an unknown temperature so that the frequency and wavelength of the output radiation provides a measure of the unknown temperature.

The crystal 10 consists of a high mobility semi-conductor. Preferably the electron mobility is at least in the order of 1200. The semi-conductor should also have a voltage breakdown strength at least in the order of several thousand volts per centimeter and preferably higher. Known semi-conductors which meet these requirements are preferably chosen from the compound semi-conductors composed of compounds formed from elements in groups III and V of the periodic table of elements including gallium arsenide, gallium phosphide, gallium antimonide, indium phosphide, indium arsenide, and indium antimonide. However, the elemental semi-conductors of silicon and germanium, and those formed from lead salts such as lead selenide and lead telluride are also useful in the invention. In general, small energy gap materials are preferably because they operate with a wider range of incident light frequencies and have high carrier mobilities. The most efficient production of the highest possible far infra-red frequencies takes place if the crystal material is chosen so that the quantum energy of the incident light exceeds the energy gap of the photoconductor crystal by at least the optical phonon energy of the crsytal material. This minimum energy difference is of the order to one tenth of an electron volt.

A gallium arsenide crystal having very high mobility, particularly at cryogenic temperatures, may be obtained by producing the crystal in a highly purified form. One method for accomplishing this is set forth in a copending patent application, Serial No. 180,970, filed March 20, 1962, by Norman G. Ainslie and entitled "Preparation of High Purity Materials" and assigned to the same assignee as the present application.

The active surface 18 of the crystal is preferably treated to have a low recombination rate. This treatment is as follows: The surface should be formed by cleaving in a vacuum or by etching surfaces prepared by other methods to remove surface strains, irregularities, and impurities. The cleaving may be carried out and in accordance with the teachings of copending patent application, Serial No. 234,141, filed October 30, 1962, by F. H. Dill and R. F. Rutz for a "Method of Fabrication of Crystalline Shapes" and assigned to the same assignee as the present application. If etching is employed, the conventional etching techniques are appropriate. For instance, the etching may be carried out by immersing the crystal in an etching solution consisting of one part hydrofluoric acid, three parts of nitric acid, and two parts of water. After immersion for three minutes in this etching solution, the crystal may be rinsed with water and then with acetone. The surfaces are also preferably passivated by the application of a suitable transparent coating which may be in the nature of the conventional quarter wave optical lens coatings.

The dimension of the active crystal surface region 18 between the electrodes 14 and 16 is preferably quite limited. The preparation of this device with a very carefully controlled dimension for area 18 is quite simple with the configuration shown. After the crystal 10 is selected, it is given a suitable metallic coating which will form the electrodes 14 and 16. By conventional selective etching procedures, a central portion of the metallic coating may be removed to expose the crystal surface at 18. If the dimension of the crystal surface region 18 between electrodes 14 and 16 is maintained at approximately one-half of the wavelength of the emitted radiation 30, then the total power radiation is at an optimum efficiency. However, if the dimension between electrodes 14 and 16 is maintained at several times the wavelength of the emitted radiation, then the emitted radiation will be highly collimated. This result may be very desirable for certain purposes. The dimension also should be maintained at several wavelengths if a convergent or divergent output radiation beam is desired as mentioned above.

It may be shown that the power of the output radiation beam may be represented by the following expression:

$$\frac{R}{2}\left[\frac{K}{\bar{\omega}} \frac{\mu E}{a\omega_b}\right]^2$$

Where:

R represents the radiation resistance of the crystal and electrode configuration of 10,
K represents a constant including an efficiency factor,
$\bar{\omega}$ represents the average optical input frequency,
$\mu$ represents the mobility of the crystal material,
E represents the voltage bias across the electrodes 14 and 16,
$a$ represents the dimensions of the gap between the electrodes 14 and 16 across the active crystal region 18, and
$\omega_b$ represents the frequency of the output radiation.

It is to be seen that the above expression confirms the preceding statements that an increase in the gap between electrodes 14 and 16 will cause a decrease in output. Likewise, a general increase in the operating frequencies causes a decrease in output power. An additional factor depending on frequency is present in the quantity K, namely that the rate of carrier generation within the crystal material is proportional to the following quantity:

$$\Gamma/\sqrt{\Gamma^2+\omega_b^2}$$

Where:

$\omega_b$ is again the frequency of the output radiation, and
$\Gamma$ is the inverse of the lifetime of the individual carrier states (in the order of $10^{13}$ to $10^{14}$ cycles per second).

While the invention has been particularly shown and described with reference to preferred embodiments thereof, it will be understood by those skilled in the art that various changes in form and details may be made therein without departing from the spirit and scope of the invention.

We claim:

1. A far infra-red radiation source operable in free space and comprising a high mobility small bandgap semi-conductor crystal having a surface region of one conductivity type, electrodes connected across said crystal to define said surface region and arranged for connection to a source of unidirectional bias voltage, apparatus for providing coherent optical radiation directed to said surface region at two wavelengths, the difference in frequencies of said two wavelengths being equal to the frequency of the desired radiation output.

2. A radiation source as set forth in claim 1 in which said semi-conductor crystal has a mobility of at least 1200 and a breakdown strength of at 2000 volts per centimeter.

3. A radiation source as set forth in claim 2 in which said semi-conductor crystal consists essentially of a group III–group V compound.

4. A radiation source as set forth in claim 3 in which said compound is gallium arsenide.

5. A far infra-red radiation source operable in free space and comprising a high mobility small bandgap semi-conductor crystal having a surface region of one conductivity type, electrodes connected across said crystal to define said surface region and arranged for connection to a source of unidirectional bias voltage, two lasers for providing coherent optical radiation respectively at two different wavelengths, the difference in frequencies of said two wavelengths being equal to the frequency of the desired radiation output, and optical refraction apparatus for directing said radiation to said surface region.

6. A far infra-red radiation source operable in a free space and comprising a high mobility small bandgap semi-conductor crystal having a surface region of one conductivity type, electrodes connected across said crystal to define said surface region and arranged for connection to a source of unidirectional bias voltage, the spacing between said electrodes and defining said surface region being between one half of the wavelength and several times the wavelength of the radiation to be emitted, apparatus for providing coherent optical radiation directed to said surface region at two wavelengths, said crystal being operable in response to said coherent radiation from said apparatus to emit radiation having a frequency equal to the difference between the frequencies of said two coherent radiation wavelengths.

7. A far infra-red radiation source operable in free space and comprising a high mobility small bandgap semi-conductor crystal having a surface region of one conductivity type, electrodes connected across said crystal to define said surface region and arranged for connection to a source of unidirectional bias voltage, apparatus for providing coherent optical radiation directed to said surface region at two wavelengths, said last-named apparatus including a separate laser for generating said coherent optical radiation at each wavelength and including means for directing at least a portion of the radiation from one of said lasers to said region at an angle of incidence different from the angle of incidence of at least a portion of the radiation from the other one of said lasers, said crystal being operable to emit radiation of a frequency equal to the difference in frequencies of said two wavelengths.

8. A far infra-red radiation source operable in free space and comprising a high mobility small bandgap semi-conductor crystal having a surface region of one conductivity type, electrodes connected across said crystal to define said surface region and arranged for connection to a source of unidirectional bias voltage, two lasers arranged to provide coherent optical radiation respectively at two different wavelengths directed to said surface region at two different angles, said crystal being operable to emit far infra-red radiation having a frequency equal to the difference between the frequencies of said coherent radiation from said lasers, said far infra-red radiation being directed at an angle which is a combined function of the frequencies and angles of incidence of said radiation from said lasers.

9. A far infra-red radiation source operable in free space and comprising a high mobility small bandgap semi-conductor crystal having a surface region of one conductivity type, electrodes connected across said crystal to define said surface region and arranged for connection to a source of unidirectional bias voltage, two lasers for providing coherent optical radiation respectively at two different wavelengths, the difference in frequencies of said two wavelengths being equal to the frequency of the desired radiation output, and optical refraction apparatus for directing said radiation to said surface region, said optical refraction apparatus including at least one convergent lens arranged in the optical path between said crystal region and the associated laser, the length of the portion of the optical path between said crystal region and said lens and the length of the portion of said optical path between said lens and the associated laser each being equal to the focal length of said lens.

10. A far infra-red radiation source operable in free space and comprising a high mobility small bandgap semi-conductor crystal having a surface region of one conductivity type, electrodes connected across said crystal to define said surface region and arranged for connection to a source of unidirectional bias voltage, two lasers for providing coherent optical radiation, said lasers being comprised essentially of the same material and said lasers being maintained at different temperatures to thereby provide radiation at two different wavelengths as a function of the temperature difference, the difference in frequencies of said two wavelengths being equal to the frequency of the desired radiation output, and optical refraction apparatus for directing said radiation to said surface region.

References Cited by the Examiner

UNITED STATES PATENTS

| 3,062,959 | 11/1962 | Sclar | 250—83.3 |
| 3,117,229 | 1/1964 | Friedland | 250—83.3 |

FOREIGN PATENTS 608,711   3/1962   Belgium.

OTHER REFERENCES

A Proposal for a Tunable Source of Radiation for the Far Infra-red Using Beats Between Optical Masers, by Laine, Nature, vol. 191, Aug. 19, 1961, pages 795, 796.

Nonlinear Optical Effects, by Braunstein, Physical Review, vol. 125, No. 2, January 15, 1962, pages 475 to 477.

RALPH G. NILSON, *Primary Examiner.*

JAMES W. LAWRENCE, *Examiner.*